Figure 1:
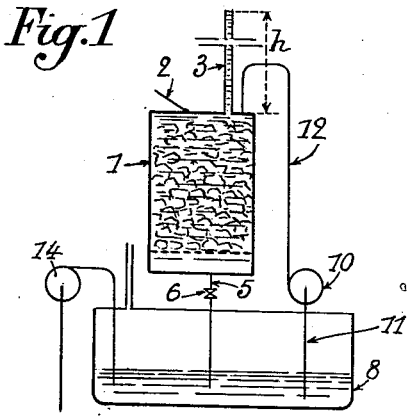

Feb. 3, 1931.   O. DAHL ET AL   1,791,022
APPARATUS FOR THE PREPARATION OF COOLING BRINES
Filed Jan. 13, 1928

INVENTORS:
Oscar Dahl
Erik Arnfinn Hallgrim Kjörstad
BY
ATTORNEYS.

Patented Feb. 3, 1931

1,791,022

UNITED STATES PATENT OFFICE

OSCAR DAHL AND ERIK ARNFINN HALLGRIM KJÖRSTAD, OF LA ROCHELLE, FRANCE

APPARATUS FOR THE PREPARATION OF COOLING BRINES

Application filed January 13, 1928, Serial No. 246,472, and in France July 27, 1927.

The present invention relates to an improved apparatus for the preparation of cooling brines, and more particularly to an apparatus adapted to be mounted on trawlers or like boats for refrigerating the fish on board the vessel as fast as caught.

For many reasons, it is desirable to prepare the cooling brine by the known process which consists in liquefying ice in a salt solution. The invention has for its object to provide a plant for carrying out the said process which will have a reduced bulk and will operate automatically, the operation requiring but little attention from the crew, and the manipulations being of a simple nature and the number thereof reduced to a minimum. Furthermore, the plant should very rapidly furnish an intense cold in order to refrigerate a large amount of fish in the least possible time, so that the refrigeration will progress as far as possible at the same rate as the fishing, whatever may be the output of the successive fishing operations.

According to the invention the above objects are obtained by the use of a closed receptacle which is kept constantly and completely filled with the mixture of ice and liquid, and optionally with salt, the liquid being supplied to the said vessel and the brine discharged therefrom in such manner that the liquid will pass through the whole mass of the ice in the most effective manner and will be in close contact with the ice. The ice will thus be quickly melted, and the brine rapidly cooled.

Due to the provision of a closed vessel which is kept completely filled with the cooling mixture, the operation of the plant and the cooling effect will take place in the most approved conditions and without interruption, not withstanding the movements of inclination of the ship at sea for instance. Inasmuch as the liquid in the receptacle has no contact with the air, the formation of scum or foam will be obviated.

According to a further feature of the invention, the ice and brine contained in the receptacle may be kept under pressure, and experience has shown that the cooling effect is thereby increased.

This increase in the cooling effect appears to be due firstly to the fact that the ice is subjected to a pressure exceeding the atmospheric pressure which tends to facilitate the liquefaction, and secondly to the fact that the ice which is formed, either naturally or artificially, at the atmospheric pressure will always contain air bubbles; when the blocks or pieces of ice are then subjected to a high pressure, the thin walls of ice surrounding the bubbles are broken and the salt water will thus come into a more intimate contact with the ice which will melt more rapidly.

The pressure may be as high as desired, and the means for exerting pressure upon the ice and salt mixture may be of any suitable type; for instance air (or any other gas) or a liquid may be forced above the said mixture into the closed receptacle.

It is sufficient in many cases, in order to obtain the desired pressure, to provide the receptacle containing the ice and salt with one or more chimneys or pipes which may be open to the air at the top, or with any equivalent means, and to force the brine into the receptacle with such a pressure that the brine will rise in the said pipes up to a suitable level; the desired pressure will obviously depend upon the height of the column of liquid situated above the said chamber. For instance, a column of some 5 meters height will produce an effective pressure of about ½ atmosphere, in addition to atmospheric pressure.

This manner of producing the pressure requires only a very simple arrangement, and further, the air bubbles contained in the cooling mixture will be given a free exit; this is an important advantage, as the formation of scum or foam is more efficiently prevented, and it is well known that foam greatly interferes with the proper operation of apparatus of the class referred to and must therefore be obviated as far as possible. The level of the column of liquid and hence the pressure may be maintained at the requisite value by means of a pump which is located at a suitable point of the circuit followed by the brine.

Further features of the invention will be specified in the following description with reference to the appended drawing, in which:

Figs. 1 to 6 show, in a diagrammatic manner and by way of example, various embodiments of the invention, in which it is assumed that the receptacle containing the ice is subjected to a pressure above atmospheric pressure.

In the diagrammatic arrangement shown in Fig. 1, 1 is a closed or fluidtight receptacle which is suitably heat-insulated; it is provided at the top with a cover 2 and with a pipe or chimney 3 of suitable height, for instance 5 to 6 meters or more, and open to the atmosphere. At the bottom, the vessel is connected by a pipe 5, provided with a cock 6, with a heat-insulated tank 8. The suction pipe 11 of a pump 10 opens into the tank 8, while the delivery pipe 12 of the pump opens into the receptacle 1 at the upper part thereof. At the outset, the tank 8 conains a certain amount of brine, for instance natural sea water, which is supplied by the pump 14.

The operation is the following: A mixture of ice and salt is poured into the receptacle 1 through the upper aperture; the cover 2, which is provided with tight packing, is then closed, and the pump 10 is operated. The opening of cock 6 is suitably regulated so as to produce a certain pressure in the vessel 1, to which corresponds a column of liquid $h$ in the pipe 3; the cooling will thus be effected under pressure. When the ice has melted, the pump is stopped, and the cold brine in the vessel 1 is allowed to flow into the tank 8 through the cock 6. The vessel 1 may be again filled. The cold brine which is thus obtained may be immediately used or preserved according to circumstances. Obviously, the cold brine may be withdrawn from tank 8 and delivered into another suitable tank through suitable pipings.

The brine in tank 8 may be kept under pressure, and for this purpose, the upper part of tank 8 may be provided with a suitable air discharge valve, adapted to open under a given limit pressure.

It will be noted that since the vessel 1 contains no air space, the formation of scum or foam is prevented. The formation of foam in the tank 8 will likewise be obviated by a suitable arrangement of the pipes opening therein.

By varying the delivery of the pump, the circulation of the brine will be effected more or less rapidly, whereby the cooling effect and the resulting temperature will be readily regulated. By varying the opening of the cock 6, the pressure in the vessel 1 may also be controlled, this providing also for a regulation of the rate of the cooling, of the amount of cold, and of the temperature.

Figure 2:
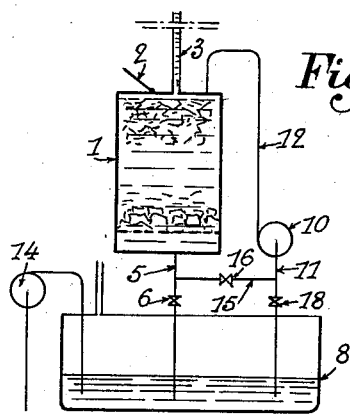

As shown in Fig. 2, the pipes 5 and 11 may be connected together by a pipe 15 provided with a cock 16, and the suction pipe of the pump with the cock 18. By closing the cocks 6 and 18 and opening the cock 16, the brine will be circulated through the vessel 1 and by-passed through tube 15 without circulating through tank 8.

Figure 3:
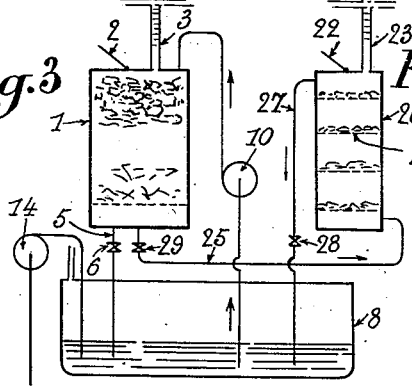

In the arrangement shown in Fig. 3, provision is made of a further separate vessel 20 containing the salt, disposed for instance upon superposed perforated discs 21; said vessel further comprises a loading inlet with its cover 22 and a vertical pipe or chimney 23. Said vessel is connected at its lower part with the vessel 1 by a pipe 25, and at its upper part with the tank 8 by a pipe 27, provided with a cock 28. By actuating the said cock, we may regulate the pressure in the vessels 1 and 20, in which the cooling takes place. The path of the brine through the ice and salt is indicated by the arrows. At the end of the operation, the brine contained in the two vessels may be delivered into the tank 8 by opening cock 6, whereby either of the said vessels may be again filled.

A cock 29 may be placed upon the pipe 25. By properly regulating the opening of cocks 28 and 29, different pressures may be obtained in the ice vessel 1 and the salt vessel 20.

Figure 4:
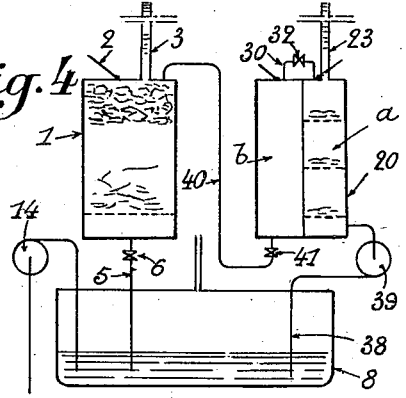

In the embodiment shown in Fig. 4, the salt vessel comprises two chambers $a$ and $b$; chamber $a$ containing salt and the chamber $b$ containing a greater or less amount of brine, and serving as a regulating or compensating chamber. The two chambers are connected together by a pipe 30 provided with a cock 32 which serves the same purpose as the aforesaid cock 28. Herein the brine, which is withdrawn from the vessel 8 through a pipe 38 by means of a pump 39, will first flow through the salt vessel 20 and will then proceed into the ice vessel 1, through a pipe 40 provided with a cock 41.

Figure 5:
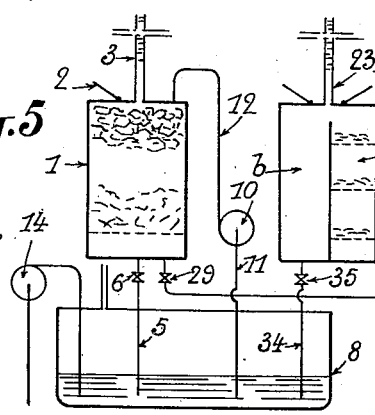

As shown in Fig. 5, the two chambers $a$ and $b$ may simply communicate with one another at the top; herein a pipe 34 connects the chamber $b$ with the tank 8 and carries a cock 35, so that a suitable reserve supply of brine may be maintained in chamber $b$ at the end of the operation, by entirely closing the cock 35.

Figure 6:
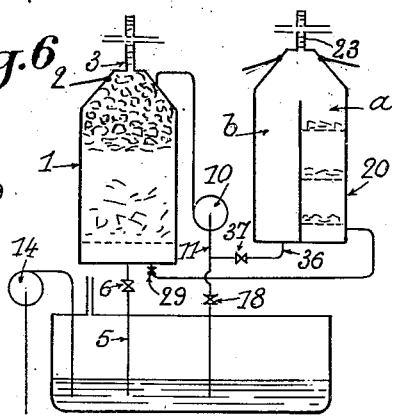

In Fig. 6, the discharge pipe 36 of the chamber $b$, with its cock 37, is connected with the suction pipe of the pump provided with the cock 18. The brine may thus be circulated into the vessels 1 and 20 without proceeding into the tank.

As shown in Fig. 6, the upper part of the various vessels may be given a pointed shape, to facilitate the discharge of the air.

Although the said plant is chiefly adapted for the cooling or freezing of fish on board vessels, the cold brine which is obtained in the plant above described may obviously be employed for other purposes, for instance for the cooling of refrigerating rooms or chambers, or the like.

The said invention is not limited to the constructions herein described, and the various arrangements specified for the pipings and cocks may be simplified in practice by the use of three-way cocks or the like, the several diagrammatic arrangements being given only by way of example and for the sake of clearness.

Having now described our invention, what we claim as new and desire to secure by Letters Patent is:

1. An apparatus for the preparation of a cooling brine, particularly on board ships, comprising a tightly closed ice receptacle, means for circulating a salt solution downwardly through said receptacle, and gas discharge means at the upper part of said receptacle for continuously discharging the gas disengaged from the brine in operation, whereby said receptacle may be kept constantly and completely filled with brine.

2. An apparatus as claimed in claim 1, wherein said gas discharge means consist of a tube in constant communication with the atmosphere.

3. An apparatus as claimed in claim 1, wherein the upper part of said receptacle has a pointed shape at the top, said gas discharging means consisting of a tube in communication with the atmosphere and opening at the upper pointed part of said receptacle.

4. An apparatus for the preparation of a cooling brine, particularly on board ships, comprising a tightly closed ice receptacle, a tube in communication with the atmosphere opening at the upper part of said receptacle and means for circulating a salt solution through said ice receptacle, whereby said tube is adapted to discharge air disengaged from the brine in operation and to contain a head of brine above said receptacle.

5. An apparatus as claimed in claim 1, which further comprises a salt container including two chambers inserted in series in the circuit followed by the brine, the brine being caused to circulate upwardly in the first chamber, and perforated members mounted in said first chamber and adapted to receive salt and to be traversed by the brine.

6. An apparatus for the preparation of a cooling brine which comprises a closed receptacle adapted to contain ice and a salt solution, an upright tube opening into said receptacle, a salt container, an upright tube opening into said container, a storage tank, means for delivering a salt solution into said tank, means for forcing the liquid of said tank into said receptacle, means for connecting the outlet of said receptacle with said salt container, means for throttling the flow of liquid through said latter means, means for connecting the outlet of said salt container with said forcing means, means for throttling the flow of liquid through said latter connecting means and means for cutting off at will the communication between said forcing means and said tank.

In testimony whereof we have signed our names to this specification.

OSCAR DAHL.
ERIK ARNFINN HALLGRIM KJÖRSTAD.